United States Patent [19]

Mueller et al.

[11] Patent Number: 6,048,041
[45] Date of Patent: Apr. 11, 2000

[54] HYDRAULIC UNIT FOR A VEHICLE BRAKE SYSTEM

[75] Inventors: Klaus Mueller, Tamm; Volker Schurr, Schwieberdingen, both of Germany

[73] Assignee: Robert Bosch GmbH, Stuttgart, Germany

[21] Appl. No.: 09/043,456

[22] PCT Filed: Jul. 9, 1996

[86] PCT No.: PCT/DE96/01237

§ 371 Date: Mar. 23, 1998

§ 102(e) Date: Mar. 23, 1998

[87] PCT Pub. No.: WO97/10979

PCT Pub. Date: Mar. 27, 1997

[30] Foreign Application Priority Data

Sep. 22, 1995 [DE] Germany ........................... 195 35 235

[51] Int. Cl.[7] ...................................................... B60T 8/36
[52] U.S. Cl. ........................................................ 303/119.2
[58] Field of Search ............................ 303/119.1, 119.2; 251/126.01; 137/596.17

[56] References Cited

U.S. PATENT DOCUMENTS 4,898,360  2/1990  VonHayn et al. .................. 251/129.01
5,374,114  12/1994  Burgdorf et al. ..................... 303/119.2
5,520,447  5/1996  Burgdorf et al. ..................... 303/119.2
5,634,695  6/1997  Ohta et al. ............................... 303/10

*Primary Examiner*—Chris Schwartz
*Attorney, Agent, or Firm*—Ronald E. Greigg; Edwin E. Greigg

[57] ABSTRACT

The invention relates to a hydraulic unit having an hydraulic block, with magnet valves inserted in apertures therein. The magnet valves include protruding valve domes on which coils are mounted. The magnet valves and coils are covered by a covering hood. For sealing purposes, a platelike sealing element, includes a beadlike edge which forms an outer sealing body. The outer sealing body rests between an edge of the covering hood and the hydraulic block, and includes inner bead-like sealing bodies, which rest between the coils of the magnet valves and the hydraulic block. The inner bead-like sealing bodies are integral, via a diaphragm or the like, with the outer sealing body. The sealing body includes a multiple sealing at the edge of the covering hood and individual sealing of each magnet valve. In addition, the inner sealing bodies act as spring elements, which press the coils against retaining struts in the interior of the covering hood and thereby fixes the coils on the valve dome.

13 Claims, 2 Drawing Sheets

HYDRAULIC UNIT FOR A VEHICLE BRAKE SYSTEM

PRIOR ART

The invention is based on a hydraulic unit for a vehicle brake system. Such hydraulic units are used in vehicle brake systems that in particular have an anti-locking or traction control system. Magnet valves are built into a hydraulic block of the hydraulic unit; in the hydraulic block, they are hydraulically connected to the brake system, and their magnetic actuating part protrudes from the hydraulic block on one side. A coil for valve actuation is slipped into the actuating part. The actuating part of the magnet valves is located under a covering hood that retains the coils on the actuating parts. To guard against the entry of dirt or water, a seal may be placed between one edge of the covering hood and the hydraulic block.

A hydraulic unit known from German Patent Disclosure DE 41 33 641 A1 has an elastic shaped body, which is placed into the covering hood or cast there, and which receives the coils of the magnet valves. The elastic shaped body has an encompassing sealing lip on the inside, resting on the hydraulic block, of the edge of the covering hood oriented towards the hydraulic block.

A disadvantage of the known hydraulic units is that they do not always seal off reliably and for the entire service life. Infiltration of the seal from corrosion can lead to the penetration of moisture under the covering hood. Moreover, relative motions between the covering hood and the hydraulic block because of the extreme temperatures that occur in an engine compartment of a motor vehicle, which can range between −40° C. and +120° C., can lead to leakage.

ADVANTAGES OF THE INVENTION

In the hydraulic unit of the invention a, sealing means is improved substantially by the additional individual sealing off of the magnet valves. Another advantage is that the sealing element presses the coils against the covering hood and thereby fixes them in their position on the actuating part of the magnet valves. An otherwise necessary fixation element, such as a sheet-metal spring, is dispensed with. Moreover, the sealing element is simple to attach to the hydraulic unit; it is positioned by being slipped onto the actuating parts of the magnet valves or by being placed in grooves of the hydraulic block along with beadlike sealing bodies that are integral with the sealing element. Compared with an elastic shaped body of the kind disclosed in the aforementioned DE 41 33 641 A1, the hydraulic unit of the invention has the advantage that its sealing element is more simply shaped and is thus easier to produce, and that it requires substantially less material.

BRIEF DESCRIPTION OF THE DRAWINGS

The invention will be described in further detail below in terms of an exemplary embodiment shown in the drawings. Shown are.

DESCRIPTION OF THE EXEMPLARY EMBODIMENT

Figure 1:
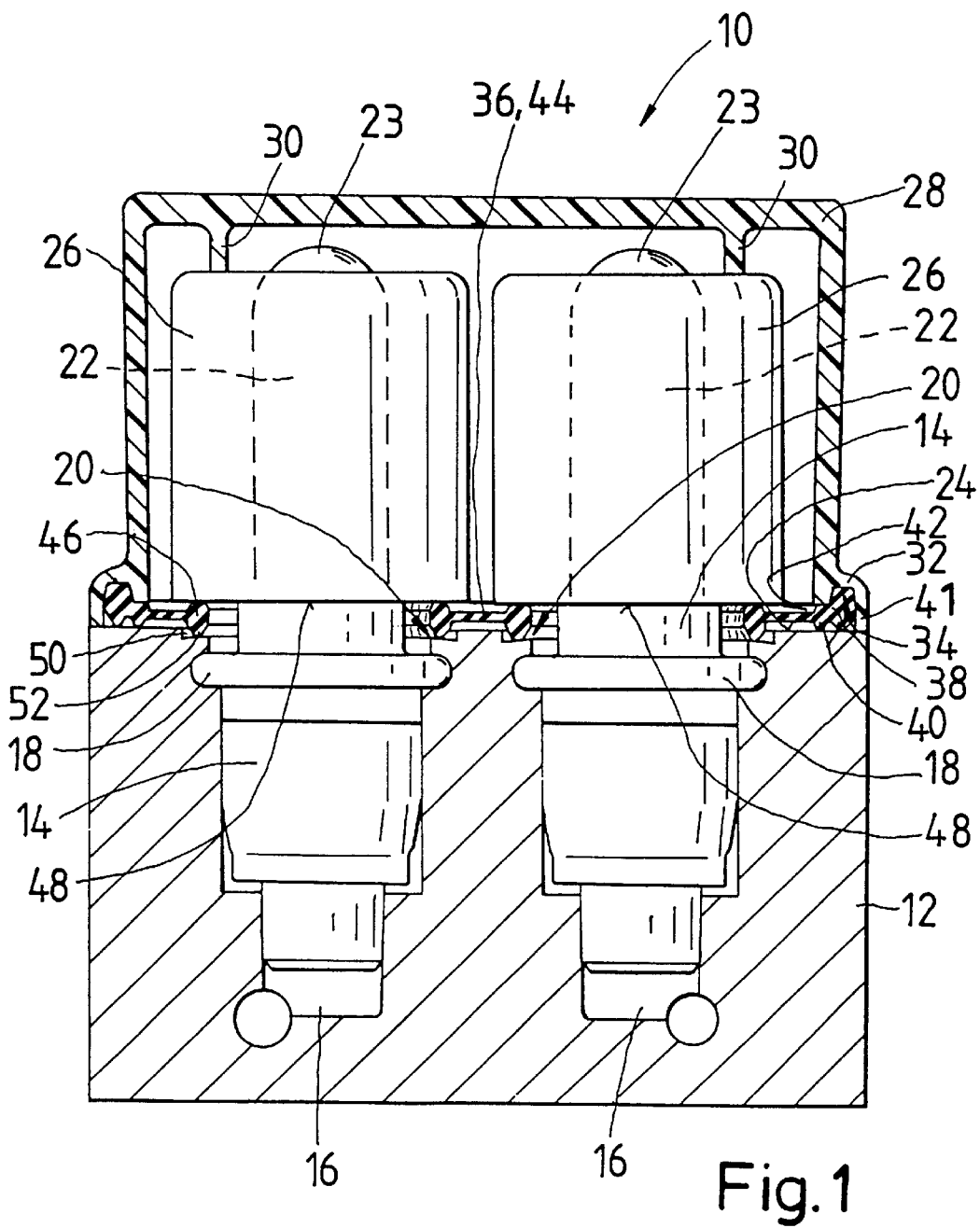
FIG. 1, a section through a hydraulic unit according to the invention.
Figure 2:
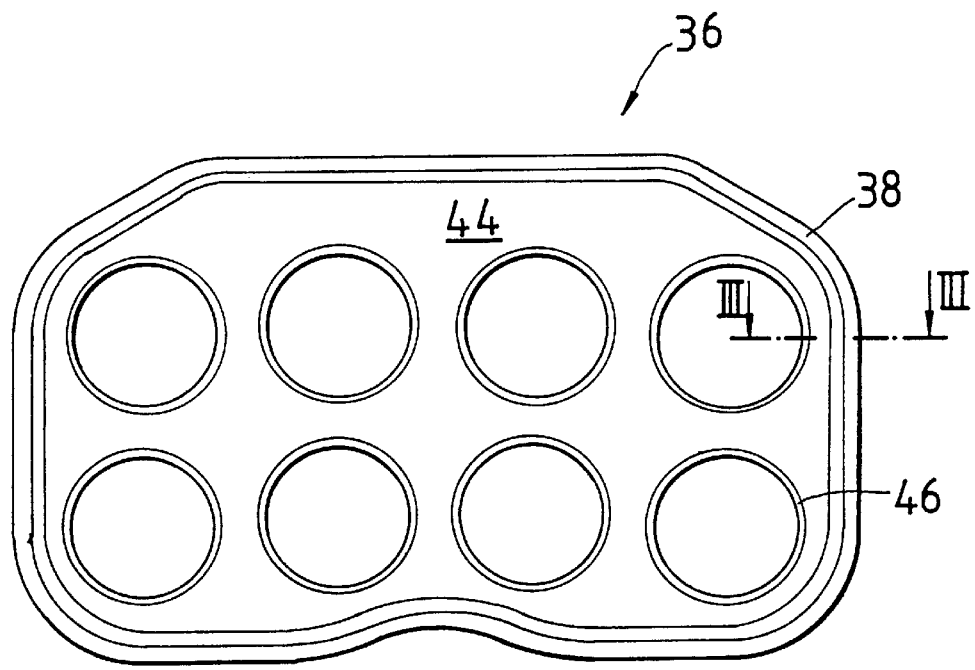
FIG. 2, a front view of a sealing element of FIG. 1 on a different scale.
Figure 3:
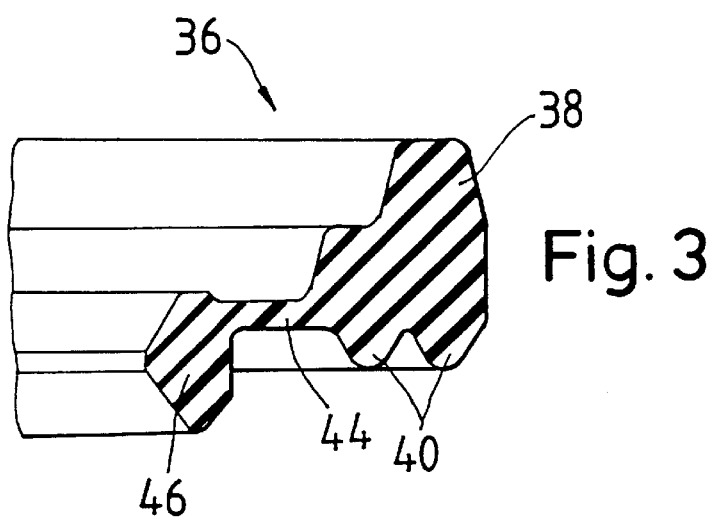
FIG. 3, an enlarged fragmentary section along the line III—III of FIG. 2, on a larger scale.

The hydraulic unit 10 according to the invention and shown in FIG. 1 has a hydraulic block 12, in which a total of eight magnet valves 14 are placed side by side in two rows. The magnet valves 14 are inserted into stepped bores 16 of the hydraulic block 12. They have a flange 18, by which they are retained by caulking 20 of material of the hydraulic block 12.

An actuating part 22 of the magnet valves 14 protrudes with a 23 portion extending from the hydraulic block 12 on one side 24. A hollow-cylindrical coil 26 for magnetic valve actuation is slipped onto the actuating part 22.

A covering hood 28 is mounted on the side 24 of the hydraulic block 12 from which the actuating part 22 of the magnet valves 14 protrudes. The covering hood 28 is a plastic injection molded part that covers the magnet valves 14. Retaining struts 30 that are integral with the covering hood 28 press on the inside of the hood in the axial direction against the coils 26 and retain them on the valve dome 23 that contains the actuating part 22 of the magnet valves 14. The covering hood . . . is positioned on the hydraulic block 12. The inner sealing body 46 has a sealing lip 52 which rests on the bottom of the step 50 and protrudes in the direction of the hydraulic block 12. It is equally possible for the outer sealing body 38 to rest in an indentation of the hydraulic block 12 (not shown).

Along with its sealing function, the inner sealing body 46 acts as a spring element, which presses the coil 26 of the magnet valves 14 in the axial direction against the retaining strut 30 of the covering hood 28. In this way, the coil 26 is axially fixed on the valve dome 23. The spacer 41 of the covering hood 28 precisely fixes the axial position of the coil 26.

The sealing element 36 is resistant to all the media that typically occur in an engine compartment of a motor vehicle, such as oils, fuel, and in particular brake fluid. The sealing element 36 preferably comprises EPDM (ethylene propylene diene rubber). It withstands ambient temperatures ranging from −40° C. to +120° C. and remains elastic at the low temperatures cited.

The foregoing relates to preferred exemplary embodiments of the invention, it being understood that other variants and embodiments thereof are possible within the spirit and scope of the invention, the latter being defined by the appended claims.

We claim:

1. A hydraulic unit (10) comprising a hydraulic block (12), magnet valves 12 are secured onto said hydraulic block, said magnet valves include magnetic actuating parts (22), said magnetic actuating parts (22) protrude from the hydraulic block (12) on one side thereof, each magnetic valve is provided with a coil (26) mounted thereon, a covering hood (28), said covering hood is mounted on the hydraulic block (12) and covers the magnetic actuating parts (22) of the magnet valves (14) and retains the coils (26) on the actuating parts (22) of the magnet valves (14); a compressible sealing element (36), extends over an entire circumference of one end of the covering hood (28), said sealing element rests between an edge (32) of the covering hood (28) and the hydraulic block (12) facing toward the hydraulic block (12), the sealing element (36) likewise rests between the coils (26) of the magnet valves (14) and the hydraulic block (12), and corresponds to a contour of the magnet valves (14).

2. A hydraulic unit in accordance with claim 1, in which the sealing element (36) has an outer encompassing beadlike sealing body (38), which rests between the edge (32) of the covering hood (28) and the hydraulic block (12).

3. A hydraulic unit in accordance with claim 2, in which the outer sealing body (38) has at least two sealing lips (40) between an end of the hood and the hydraulic block 12.

4. A hydraulic unit in accordance with claim 2, in which the sealing element (36) has inner beadlike sealing bodies (46), which rest between the coils (26) and the hydraulic block (12) and one each of the sealing bodies enclose one magnet valve (14).

5. A hydraulic unit in accordance with claim 2 in which the covering hood (28) includes spacers (41), by which the covering hood braces itself on the hydraulic block (12).

6. A hydraulic unit in accordance with claim 2, in which the hydraulic block (12) has at least one indentation (50), in which the outer bead like sealing bodies (38), and an inner sealing body (46) rest.

7. A hydraulic unit in accordance with claim 1, in which the sealing element (36) has inner beadlike sealing bodies (46), which rest between the coils (26) and the hydraulic block (12) and one each of the sealing bodies enclose one magnet valve (14).

8. A hydraulic unit in accordance with claim 7, in which the hydraulic block (12) has at least one indentation (50), in which an outer beadlike sealing body (38) and said inner beadlike sealing bodies (46) rest.

9. A hydraulic unit in accordance with claim 8, in which the inner beadlike sealing bodies (46) and the outer beadlike sealing body (38) are connected together.

10. A hydraulic unit in accordance with claim 9, in which the inner beadlike sealing bodies (46) and the outer beadlike sealing body (38) are connected together by a diaphragm.

11. A hydraulic unit in accordance with claim 8, in which the inner beadlike sealing bodies (46) and the outer beadlike sealing body (38) are connected by struts of the sealing element (36).

12. A hydraulic unit in accordance with claim 1, in which the sealing element (36) comprises ethylene propylene diene rubber.

13. A hydraulic unit as set forth in claim 1, in which said inner beadlike sealing element (36) is located between one end face 48 of the coils (26) and the hydraulic block 12.

* * * * *